United States Patent [19]

Kunst et al.

[11] 4,178,244

[45] Dec. 11, 1979

[54] PROCESS FOR REMOVAL OF HARDENING AND GALVANIZING WASTE WATER

[75] Inventors: Helmut Kunst, Hanau; Georg Wahl, Bergen-Enkheim, both of Fed. Rep. of Germany

[73] Assignee: Deutsche Gold- und Silber Scheideanstalt vormals Roessler, Frankfurt, Fed. Rep. of Germany

[21] Appl. No.: 817,013

[22] Filed: Jul. 19, 1977

[30] Foreign Application Priority Data

Jul. 28, 1976 [DE] Fed. Rep. of Germany ....... 2633772

[51] Int. Cl.$^2$ .............................................. C02C 5/00
[52] U.S. Cl. ..................................... 210/71; 110/243; 210/56; 210/63 R; 210/73 R; 159/47 WL; 423/210.5
[58] Field of Search ............... 110/8 R, 243; 159/1 R, 159/46, 47 R, 47 WL, DIG. 8; 210/56, 63 R, 66, 67, 50, 71, 73 R, 152, DIG. 31; 423/210.5, 236

[56] References Cited

U.S. PATENT DOCUMENTS

| | | | |
|---|---|---|---|
| 3,642,583 | 2/1972 | Greenberg et al. | 210/71 |
| 3,647,358 | 3/1972 | Greenberg | 423/210.5 |
| 3,865,921 | 2/1975 | Reinhardt et al. | 210/DIG. 31 |

FOREIGN PATENT DOCUMENTS

| | | | |
|---|---|---|---|
| 1696131 | 2/1973 | Fed. Rep. of Germany | 210/152 |
| 2150679 | 4/1973 | Fed. Rep. of Germany | 210/56 |
| 48-0190 | 1/1973 | Japan | 210/67 |
| 49-27743 | 7/1974 | Japan | 210/DIG. 31 |

*Primary Examiner*—Charles N. Hart
*Assistant Examiner*—Peter A. Hruskoci
*Attorney, Agent, or Firm*—Cushman, Darby & Cushman

[57] ABSTRACT

Waste waters from salt bath hardening and galvanizing operations are removed through evaporation of the injurious material containing waste water and complete detoxification of the concentrate from the evaporation. The waste waters are first brought to a salt content of 300-500 grams/liter and this concentrated solution is then supplied to a molten salt bath.

8 Claims, 1 Drawing Figure

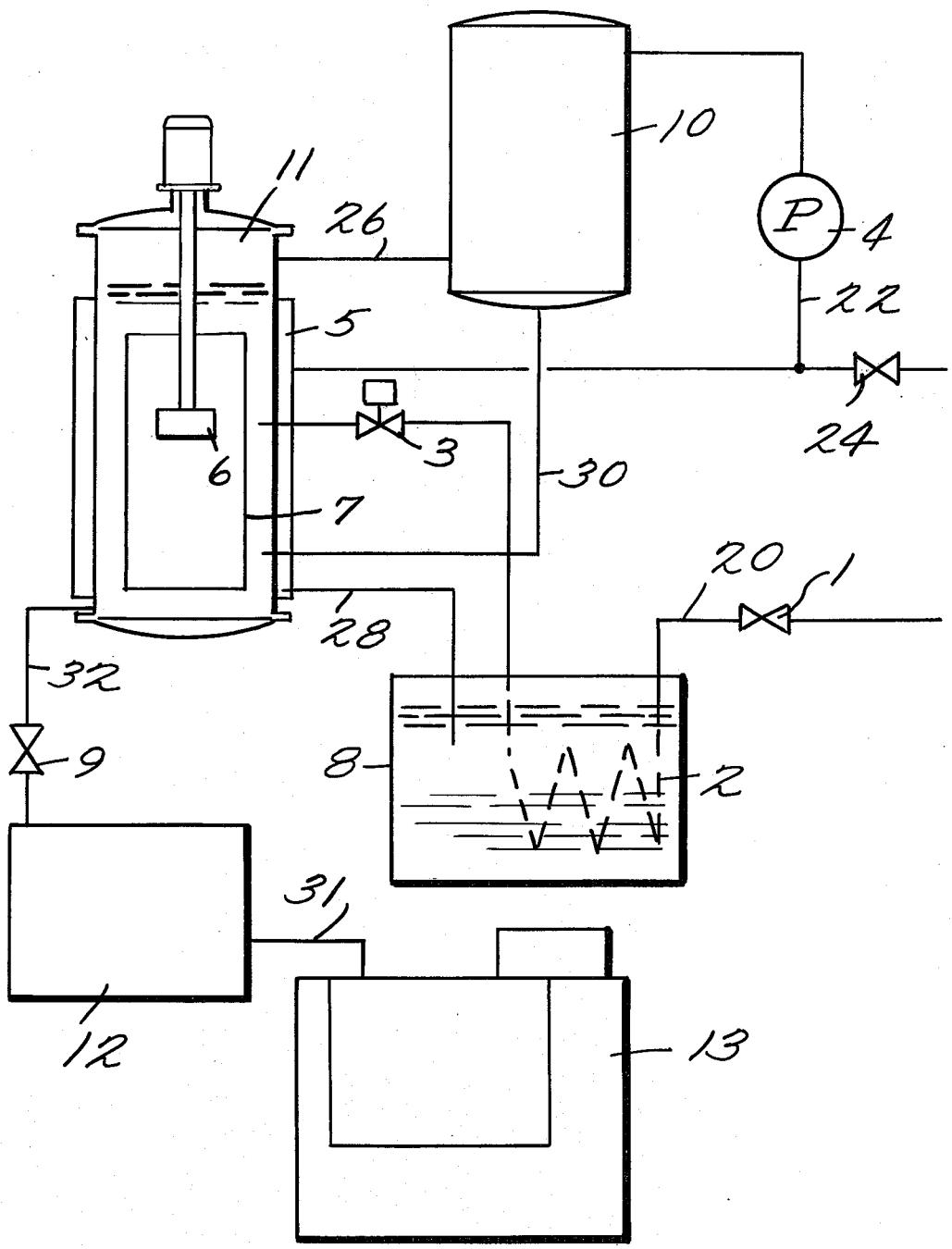

PROCESS FOR REMOVAL OF HARDENING AND GALVANIZING WASTE WATER

BACKGROUND OF THE INVENTION

The invention is directed to a process for removal of waste water from salt bath hardening and galvanizing operations by evaporation of waste water and complete detoxification of the evaporated concentrate.

Waste waters accumulating in hardening and galvanizing operations in many cases have a considerable content of injurious materials. There may be mentioned in particular cyanides, barium compounds, nitrites and heavy metal ions. These materials must be made harmless by costly and time consuming detoxification procedures before the introduction of the waste water into the sewer system. A number of processes are known for this purpose, e.g., the detoxification of the cyanide with chlorine bleach liquor, e.g., sodium hypochlorite, or hydrogen peroxide, and the precipitation of barium compounds as sulfate. This process permits a trouble-free detoxification of the waste water but generally leads to a strong saltification. Thus, in the detoxification of 1 kg of cyanide with chlorine bleach liquor depending on the concentration up to 10 kg of salt impurities are produced. Also, in the more favorable process from this point of view in which hydrogen peroxide is employed there are still formed up to 4 kg of salt impurities.

Therefore, there have been attempts to reduce this high salt impurity content by suitable measures. Thus, it was sought to reduce the consumption of water as much as possible, which is possible, e.g., by cascade connection in the quenching of construction parts in hardening operations and has led to a certain amount of success. This process, however, has the disadvantage that the amount of salt reaching the waste water still remains high despite the smaller amount of waste water. Furthermore, there have been developed processes based on evaporating salt solutions which only contain a specific salt of a definite mixture of salts (e.g., nitrite-nitrate). Through this on one hand it is possible to reduce the amount of waste water, on the other hand the recovered salt can be reused and therewith the economy of the process be improved. However, this process can only be used with such waste waters that only contain one kind of salt or a definite salt mixture, but not with complex salt mixtures.

Also in recent times there have been increasing attempts to evaporate the entire waste water and to store the remaining salt mixture which contains all the injurious materials in unchanged form in suitable deposits (below ground deposits). In these processes until now there were exclusively employed apparatuses in which the waste water, in some cases after preceding preliminary concentration, are sprayed from outside to an internally steam heated drum. The salt film is continuously scraped off. Since when poisonous components are present in waste water the residue also is poisonous, it must either be destroyed by burning or be stored in a poisonous refuse deposit. In this process also therefore the economy is small.

Therefore it was the problem of the present invention to develop an economical process for the removal of the total injurious material containing waste water of a hardening or galvanizing operation. No poisonous components in gaseous, liquid and/or solid form should remain or form thereby and to the greatest extent possible there should none result in the waste water carried off.

SUMMARY OF THE INVENTION

According to the invention, the problem is solved by first bringing the entire waste water accumulating in a salt bath hardening or galvanizing operation by evaporating to a concentration of 300 to 500 grams salt content per liter and then supplying this concentrated solution to a liquid (molten) salt bath.

For the purpose of the invention there is particularly suited a salt bath based on sodium hydroxide and/or potassium hydroxide, sodium nitrate and sodium sulfate and/or potassium sulfate and which is operated at 300° to 500° C. or even up to 600° C. There can also be present potassium nitrate. Cyanides and cyanates upon entry into the salt bath are oxidized quantitatively to carbonates. The heavy metals are precipitated as oxides or hydroxides and settle as a sludge. The barium is likewise separated in the sludge as sulfate. The sludge of such a bath which can be withdrawn without trouble by suitable apparatus besides the original bath constituents accordingly consists of barium sulfate, metal hydroxides or oxides, carbonates and a small part of nitrite. This type of salt mixture can be stored in ground water secured separate refuse deposits without further precautions.

In consideration of the necessary operating temperature of 300° to 500° C., a covering of the salt bath is suitable since it is inclined to spatter in the introduction of the aqueous salt solution.

BRIEF DESCRIPTION OF THE DRAWINGS

The invention will be understood best in connection with the drawings wherein:

The single FIGURE is a schematic illustration of an evaporation apparatus suitable for carrying out the process of the invention.

Referring more specifically to the drawing the evaporation apparatus is composed of individual parts which are known of themselves are laid out for the highest possible energy saving operation. The waste water after passing an oil separator with the usual concentration of 0.5 to 10 grams of salts per liter enters via valve 1 in line 20 into the evaporation apparatus, is preheated in a heat exchanger 2 by the warm condensate having a temperature of 60°–70° C. and then via valve 3 enters evaporator 11. In this container 11 there prevails a reduced pressure (total pressure about 0.5 bar) which is produced by the pump 4 in line 22 which line also contains valve 24. Through a steam jacket 5 which is heated to about 80° C. by an auxiliary steam producer the temperature is held to this valve. Through a rotator 6 and a guide cylinder 7 circulation is provided for. At the stated temperature-pressure conditions the water is continuously evaporated in the evaporater 11. The vapor via separator 11 for the liquid being vaporized (to which separator it enters via line 26) and the evaporator 11 enters total collector 8 as condensate via line 28. Condensate goes from separator 10 via line 30 to the lower portion of evaporator 11. The condensate in collector 8 preheats the waste water through heat exchanger 2. The condensed water can be continuously drawn off from collector 8 and again used as water fit for industrial use. The concentrated waste water with a salt content of 300 to 500 grams per liter is intermittently withdrawn from evaporator 11 via cock 9 and line 32, led to an intermediate container 12 and from this is continuously led via line 34 to a salt bath 13. This salt bath has the function of destroying the toxic constituents of the waste water concentrate or to convert such toxic materials to non-toxic components.

The process can comprise, consist essentially of or consist of the stated steps and the salt bath can comprise, consist essentially of or consist of the stated materials. The salt bath composition preferably contains 60–90 weight % alkali hydroxide, 5–20 weight % alkali nitrate and 5–20 weight % alkali sulfate.

Unless otherwise indicated all parts and percentages are by weight.

The process of the invention will be further explained in connection with the following examples.

DESCRIPTION OF THE PREFERRED EMBODIMENTS

EXAMPLE 1

10 cubic meters of a hardening bath waste water having the following composition (in mg/l)

| $CN^-$ | 199 | $Cl^-$ | 1554 |
|---|---|---|---|
| $CNO^-$ | 131 | $CO_3^{2-}$ | 756 |
| $NO_2^-$ | 638 | $Na^+$ | 2273 |
| $NO_3^-$ | 833 | $Ba^{2+}$ | 563 |
| | | (The total is: | 6947 mg/l) |
| | | (6.947 g/l) | | were evaporated in the evaporator described in the drawings to a volume of 150 liters (salt concentration=463 g/l). This concentrate was continuously supplied into a salt bath of the following composition

| KOH | 47 weight % |
|---|---|
| NaOH | 34 weight % |
| $NaNO_3$ | 8 weight % |
| $Na_2SO_4$ | 11 weight % | which was employed at 350° C. in a salt bath tank furnace having a size of 800 mm long, 600 mm wide and 600 mm deep and having a salt content of 560 liters. The tank furnace was equipped with a rotator and a side desludging chamber as well as with a cover. The addition of the waste water concentrate took place within 10 hours (15 liters/h). 30 minutes after the end of the addition of waste water concentrate there were no longer detectable in the bath cyanide, cyanate or barium compounds. The sludge withdrawn from the bath consisted of barium sulfate and potassium and sodium carbonates, hydroxides, nitrates, nitrites and sulfates. The amount of waste water destroyed with recovery of industrially usable water in this way corresponds to the daily requirements of an average to large hardening plant.

EXAMPLE 2

In 8 cubic meters of the waste water from a galvanizing operation in which by recirculating water the operation was carried out with the highest possible saving of water and which waste water had the following composition (in mg/l)

| $Fe(CN)_6^{3-}$ | 148 | $Cr^{(VI)}$ | 138 |
|---|---|---|---|
| $Cu(CN)_4^{3-}$ | 45 | $CN^-$ (free) | 845 |
| $Cd(CN)_4^{2-}$ | 32 | $Cl^-$ | 2360 |
| $Ni(CN)_4^{2-}$ | 156 | $OH^-$ | 2420 |
| $Zn(CN)_4^{2-}$ | 232 | $SO_4^{2-}$ | 632 |
| | | $Na^+$ | 5630 |
| (The total is: | | | 12638 mg/l) |
| (12.638 g/l) | | | | as well as organic chemicals (complex formers) there was first reduced the hexavalent chromium in the usual manner to trivalent chromium. Then the waste water was evaporated in the manner described to a volume of 240 liters (salt concentration=421 g/l). The concentrate was supplied to the salt bath described in Example 1 which in this case operated at a temperature of 380° C. The time of addition was 14 hours (about 17 l/h).

An hour after the end of the addition there were no longer detectable free or complex cyanides, or heavy metal ions or organic compounds. The sludge withdrawn from the bath contains the heavy metals as hydroxide or oxide.

The process of the invention has the substantial advantage that no waste water need be led off into the sewage system which means that this process can be operated far more economically than previous processes. Besides in the evaporation industrially usable water is recovered that can be used again.

What is claimed is:

1. In a process for the elimination of toxic cyanide, nitrite, barium compound or heavy metal ions from waste water from a salt bath hardening or galvanizing operation by evaporation of the toxic material containing waste water and complete detoxification of the evaporated concentrate in a salt bath, said waste water having a salt concentration below 300 g/l, the improvement comprising first evaporating the waste water to a salt concentration of 300 to 500 g/l and then supplying the concentrated solution to a molten salt bath having a temperature of 300° to 600° C. consisting of 60–90 weight % alkali metal hydroxide, 5–20 weight % alkali metal nitrate and 5–20 weight % alkali metal sulfate to completely detoxify said evaporated concentrate.

2. The process of claim 1 wherein the hydroxide, nitrate and sulfate are sodium or potassium hydroxide, nitrate and sulfate.

3. The process of claim 1 wherein the temperature of the salt bath is 300° to 500° C.

4. The process of claim 1 wherein the waste water contains cyanide, complex cyanide, cyanate or barium ions.

5. The process of claim 1 wherein the waste water contains cyanide, cyanate and barium ions.

6. The process of claim 5 wherein the waste water also contains nitrite ions.

7. The process of claim 1 wherein the waste water contains cyanide and complex cyanide ions.

8. The process of claim 7 wherein the complex cyanide ions include at least one of $Fe(CN)_6^{3-}$, $Cu(CN)_4^{3-}$, $Cd(Cn)_4^{2-}$, $Ni(CN)_4^{2-}$ and $Zn(CN)_4^{2-}$.

* * * * *